US006329928B1

(12) United States Patent
Hershey

(10) Patent No.: US 6,329,928 B1

(45) Date of Patent: Dec. 11, 2001

(54) MAGNETIC INDUCTION METER INTRA-BUILDING COMMUNICATION SYSTEM

(75) Inventor: John Erik Hershey, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/216,775

(22) Filed: Dec. 21, 1998

(51) Int. Cl.[7] ........................ H04Q 9/00

(52) U.S. Cl. ........................ 340/870.07; 340/870.31; 340/870.11; 343/718; 343/720; 343/866; 343/713; 455/6.1; 455/41

(58) Field of Search ........................ 340/870.31, 870.07, 340/870.11; 343/806, 718, 713, 720, 728, 872; 455/6.1, 41, 274; 52/110

(56) References Cited

U.S. PATENT DOCUMENTS

| | | | | |
|---|---|---|---|---|
| 3,717,876 | * | 2/1973 | Volkers | 343/712 |
| 4,480,480 | * | 11/1984 | Scott | 73/769 |
| 5,563,906 | | 10/1996 | Hershey et al. . | |
| 5,565,876 | * | 10/1996 | Murakami | 343/713 |
| 5,905,469 | * | 5/1999 | Lindenmeier | 343/713 |
| 5,966,641 | * | 10/1999 | Flowerdew | 455/41 |
| 6,057,803 | * | 5/2000 | Kane | 343/713 |
| 6,064,345 | * | 5/2000 | Ohnishi | 343/713 |
| 6,172,651 | * | 1/2001 | Du | 343/850 |

FOREIGN PATENT DOCUMENTS 10-74901-A * 3/1998 (JP) .

OTHER PUBLICATIONS

Derwent Abstract RD 97405035 (WPIACC No: 98–12877/199812).*

"Modest But Useful Erasure Technique For DPSK," JE HersheyRT Hoctor; AA Hassan; Electronic Letters, vol. 33, No. 1, Jan. 2, 1997, pp. 21–22.

"Condensed Catalogue of Electromagnetic Environment Measurements, 30–300HZ," J. Randa, D. Gilliland, W. Gjertson, W. Lauber, M. McInerney, 1993 International Symposium on Electromagnetic Compatibility, pp. 126–131.

"Natural Nosie Fields from 1 cps to 100 kc," E. Maxwell, D. Stone, IEEE Transactions on Antennas and Propagation, vol. AP–11, May 1963, pp. 339–343.

* cited by examiner

*Primary Examiner*—Michael Horabik
*Assistant Examiner*—Albert K. Wong
(74) *Attorney, Agent, or Firm*—John F. Thompson; Jill M. Breedlove

(57) ABSTRACT

A communication system which utilizes the building metal frame as a communication medium is described. More particularly, and in accordance with one embodiment of the present invention, a wire coil is located near to one of the frame pieces so that the coil lays flat in the plane of the building face. A time varying current in the coil creates a time varying magnetic dipole field. This field changes the flux within a "flux window" which is defined as one of the rectangular sections formed by the frame steel members. This changing flux creates a time varying potential around the window, which creates a time varying current that acts in opposition to the induced flux. This current also excites a time varying flux in the neighboring flux windows, which induces time varying fluxes in their neighbors and so on. Generally, a transmit/receive coil is located at each distribution board and relays ("mutter") the collected readings from one floor to the one below it and so on until all the readings are collected at the basement.

12 Claims, 4 Drawing Sheets

MAGNETIC INDUCTION METER INTRA-BUILDING COMMUNICATION SYSTEM

BACKGROUND OF THE INVENTION

This invention relates generally to a communication system and more particularly, to a communication system for communicating energy consumption data in a high rise building.

High rise apartment facilities are transitioning away from "rent inclusive" packages to packages wherein tenants are individually billed for utility services such as electricity. To individually bill each tenant, the electricity consumption for each apartment unit must be metered. Typically, separate meters are utilized to collect and store such consumption data. In addition, the consumption data for each apartment unit must be collected and provided to the utility billing department so that bills can be prepared and sent to each tenant.

To reduce the time and costs associated with reading many meters, automated meter reading (AMR) systems may be utilized. Some systems utilize, for example, power line or radio communications. Other systems are hybrids, i.e., both power line and radio communications are utilized. Typically, with known AMR systems, data and commands can be transmitted between a central station and the electricity meters. Such systems enable utilities to easily and quickly obtain energy consumption measurements at many different sites.

In a high rise apartment facility, radio communications may not be feasible due to signal interference. Also, power line communications between a central station and each meter in the apartment facility may be prevented by components within the delivery network. For example, in a high rise apartment facility, electricity is transported to higher floors at 480 volts and then stepped down to 208 volts at a distribution board. A distribution board generally is associated with each floor to step down the line voltage to an appropriate magnitude for each apartment unit on that particular floor. Energy consumption of each apartment unit is separately metered at, or downstream from, the distribution board.

In order to communicate via the power lines from a central station to an electricity meter in the highrise facility, a communication signal must pass through a distribution board. The distribution boards, however, highly attenuate the communication signals. As a result, the integrity of the communication signal may be compromised.

It would be desirable to provide a communication system which enables automated meter reading of meters in high rise complexes such as apartment complexes.

BRIEF SUMMARY OF THE INVENTION

A communication system for communicating using a building metal frame, the frame forming a plurality of floors, comprises a coil configured to be located adjacent the building frame and at a floor F, and a distribution unit coupled to the coil and configured to excite the coil with a time varying signal.

DETAILED DESCRIPTION OF THE INVENTION

This application is related in subject matter to U.S. patent application Ser. No. 09/132,080, filed Aug. 10, 1998, for "Automatic Meter Reading System Using Locally Communicating Utility Meters", which is assigned to the assignee of this application, and is hereby incorporated by reference.

In the early stage of a high rise construction, a metal frame for the building is constructed. A building frame typically includes a plurality of frame members welded to form a support structure, or grid. The grid of frame members forms supports for a plurality of respective floors. Rectangular shaped openings defined by the frame members are sometimes referred to herein as "windows" or "flux windows". In accordance with one embodiment of the present invention, a wire coil is located within a window and near one grid frame member on each floor so that the units lay flat in the plane of the building face. Each coil is coupled to a distribution unit for the particular floor. Each distribution unit includes a processor programmed to control current flow through the coil based on, for example, energy consumption data supplied to the unit from electricity meters.

As described below in more detail, the coil relays "mutter" the collected readings from one floor to the floor below it and so on until all the readings are collected at a lower floor, e.g., the basement.

More specifically, and with respect to transmission of data, a time varying current in one of the coils creates a time varying magnetic dipole field. This field changes the flux within the "flux window" associated with the excited coil. The changing flux creates a time varying potential around the window, and the time varying potential creates a time varying current which opposes the induced flux. The time varying current also excites a time varying flux in the neighboring flux windows, and the flux in the neighboring windows induces time varying fluxes in their neighbors and so on.

The signal induced in the coil located in the flux window immediately adjacent and below the excited coil is demodulated and the transmitted data may then be retransmitted to the next lower floor. A collection unit may be located at the lowermost floor, and the data collected at the collection unit can be transmitted, e.g., via radio or power line, to a central station for further processing.

In accordance with the present invention, and rather than considering the building frame a source of interference which may inhibit communication, the building frame actually is utilized as a communication medium for facilitating communication applications such as AMR. Such communication system enables remote reading of electricity meters even in a high rise building, and does not require significant capital investment for implementation.

Figure 1:
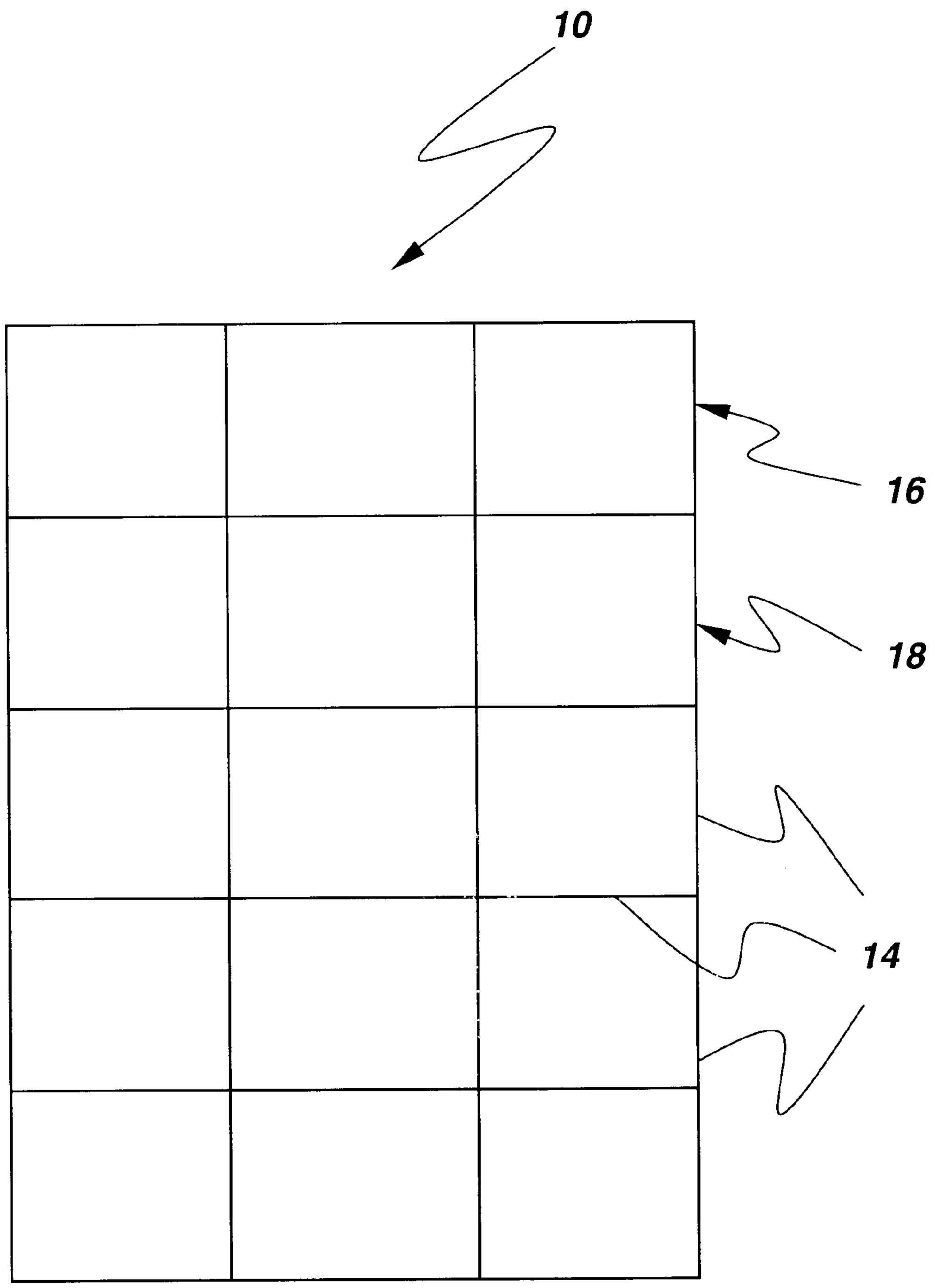
FIG. 1 is a schematic illustration of one face of a building.

A schematic illustration of a portion of a building frame 10 and more particularly, a face 12 of frame 10, is illustrated in FIG. 1. Frame 10 is formed by a grid, or matrix, of steel frame members 14.

Frame 10 forms a plurality of floors, e.g., a top floor 16 and a floor 18 immediately below top floor 16. Typically, a power distribution board (not shown in FIG. 1) is located on each floor 16, 18 and each board is coupled to a 480 volt power line. The power signal voltage is stepped down at each board to 208 volts for distribution to the individual units on the floor. Energy consumption of each unit, e.g., each apartment unit, frequently is separately metered at, or downstream from, the distribution board. As explained above, the distribution board highly attenuates communication signals passed therethrough and generally inhibits using the power lines as the communication medium for obtaining metering data from the many meters located within the building. As those of ordinary skill in the art will recognize, the present invention may be employed in conjunction with power distribution systems other than the typical 480 volt systems systems described herein.

With respect to radio communications, frame 10 interferes with transmission, and impacts the integrity, of radio signals transmitted therethrough. Due to the attenuation caused by frame 10, using a radio transmitter to transmit metering data from a location within a building constructed using frame 10 to a central source generally is not practical.

Until now, attenuation caused by building frame 10 and the distribution boards have inhibited widespread use of known AMR systems in high rise buildings. To overcome these problems, the present invention utilizes the conductive characteristics of building frame 10 to facilitate, rather than inhibit, automated meter reading.

Figure 2:
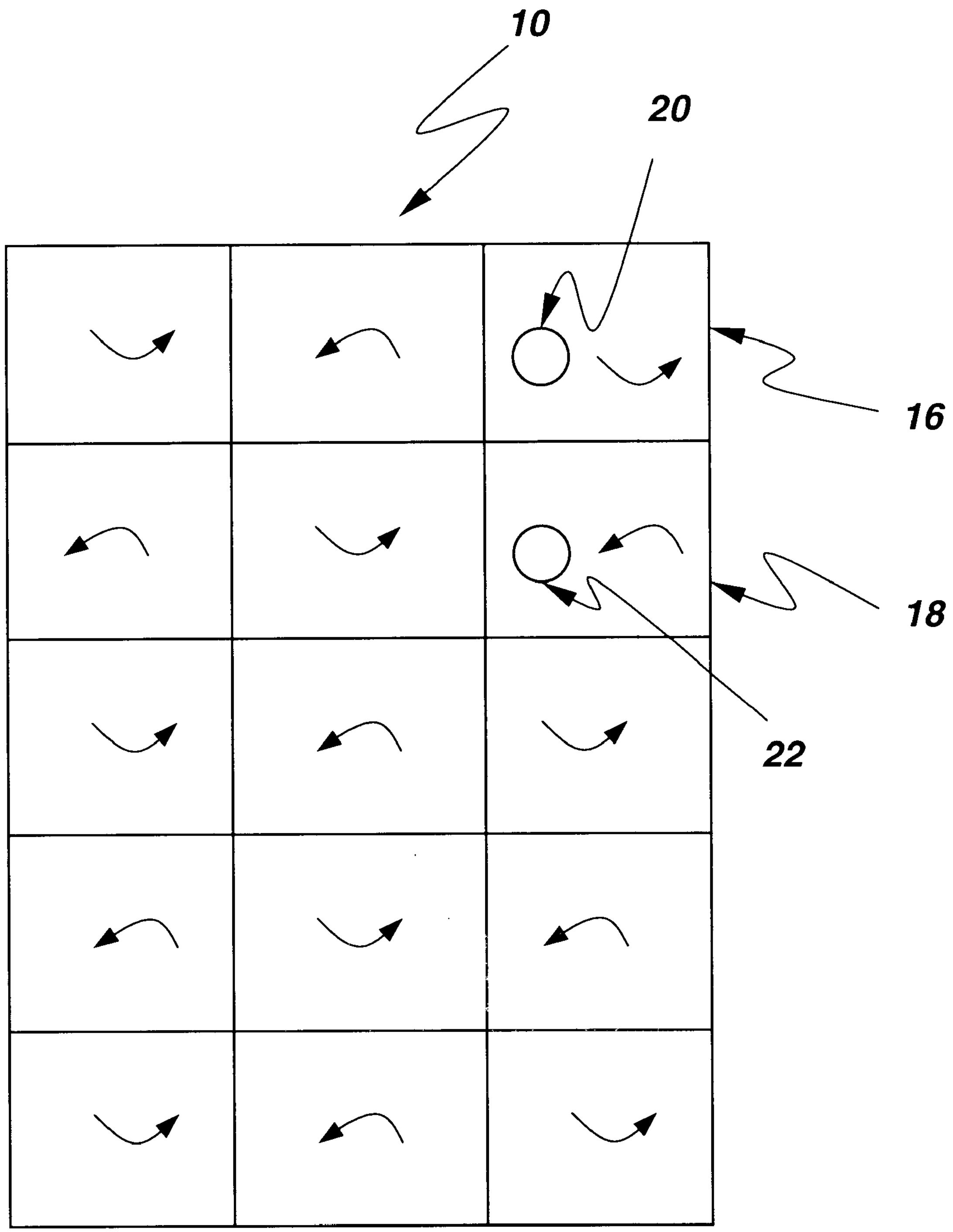
FIG. 2 is a schematic illustration of an exciting coil at the top floor of the building schematically illustrated in FIG. 1.

In the embodiment shown in FIG. 2, an exciting coil 20, alternatively referred to as transmitting coil 20, is located at top floor 16 and a receiving coil 22 is located on floor 18. Coils 20 and 22 are coupled to distribution units (not shown in FIG. 2) for respective floors 16 and 18. Each distribution unit includes a meter register board having a processor and a memory (e.g., Electrically Erasable Programmable Read Only Memory). Metering data, including but not limited to, KiloWatt Hours (KWH) used, load profile, etc., is stored in the register memory. Further details regarding the distribution unit are set forth below. Although only 2 coils are shown in FIG. 2, it should be understood that transmit and receive coils are located on each floor and each coil is coupled to a respective distribution unit.

To transmit the data from floor 16 to floor 18, the register processor excites coil 20 using a time varying signal, for example a 30 Hz sinusoidal signal, modulated based on the data stored in the register memory. A time varying current in coil 20 creates a corresponding time varying magnetic dipole field. This field changes the flux within a "flux window". More particularly, each section 24 formed by frame members 14 is referred to herein as a "flux window". The changing flux created by current flow through coil 20 creates a time varying potential around window 24 in which transmitting coil 20 is located, and this time varying potential creates a time varying current which acts in opposition to the induced flux. This current also excites a time varying flux in neighboring flux windows 24, e.g., window 24 in which receiving coil 22 is located, which also induces time varying fluxes in their neighbors, and so on. In FIG. 2, the direction of the flux in each respective window 24 and induced by exciting transmitting coil 20 is indicated by the arrows.

The flux induced in window 24 in which receiving coil 22 is located induces a current in coil 22. Such induced current is proportional to the modulated signal used to excite transmitting coil 20. The distribution unit coupled to coil 22 demodulates the signal from coil 22, and the data transmitted from coil 20 is extracted and processed. The data received by the distribution unit on floor 18 is retransmitted to the next lower floor, and such retransmission occurs from floor to floor until the data is received at a collection unit. The collected data is then transmitted, e.g., via radio, to a central station using a transceiver externally located with respect to building frame 10, for example, on top of building frame 10.

Figure 3:
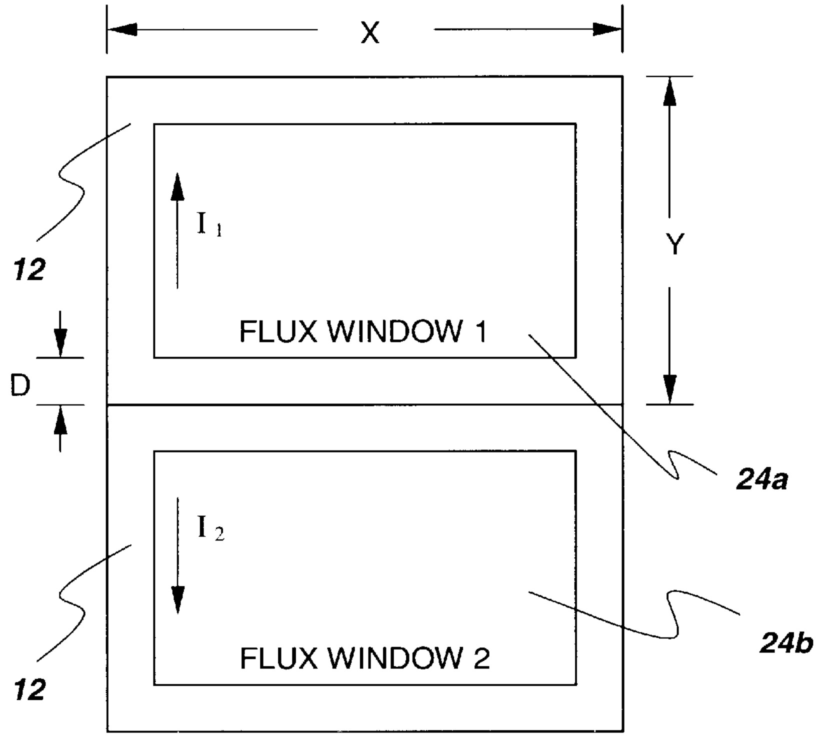
FIG. 3 illustrates adjacent flux windows.

Referring to FIG. 3, and with respect to coupling between adjacent flux windows FLUX WINDOW 1 indicated at 24*a*, and FLUX WINDOW 2 indicated at 24*b*, for a first order analysis, the two adjacent flux windows are considered separately and with dimensions as labeled in FIG. 3. For purposes of this specification, the term "adjacent" means having a common border. Particularly, FLUX WINDOW 1 and FLUX WINDOW 2 each have a width X and a height Y. Steel frame members 12 each have a depth D. In the typical embodiment shown in FIG. 3 FLUX WINDOW 1 and FLUX WINDOW 2 have equal dimensions. As will be recognized by those skilled in the art, however, the dimensions need not be the same.

A current $i_1$ flows in members 12 defining a perimeter of FLUX WINDOW 1 and a current $i_2$ flows in members 12 defining a perimeter of FLUX WINDOW 2. In the present example, X=7.6 meters (~25 feet). Assuming that $i_1$ is uniformly distributed through steel members 12 of FLUX WINDOW 1, the flux, Φ, induced in FLUX WINDOW 2 is approximately:

$$\Phi \approx \mu_0 X \int_{\frac{D}{2}}^{Y} \frac{i_1}{2\pi r} dr = \mu_0 X\left(\frac{i_1}{2\pi}\right)\ln\left(\frac{2Y}{D}\right). \tag{1}$$

The voltage induced around FLUX WINDOW 2 is:

$$V = -\oint_{=\frac{d\phi}{dt}} \overline{E}\cdot\overline{dl}. \tag{2}$$

Assuming that $i_1=i_0\sin\omega t$, and using the free space permeability, $\mu_0=4\pi\cdot10^{-7}$ henrys/meter, then approximately:

$$\left|\frac{i_2}{i_1}\right| = 4.6\cdot10^{-6}\cdot\frac{w}{R}, \tag{3}$$

where R is the resistance in the flux window boundary structure around which the contour integral was taken. The current excitation in the flux window below can then be approximated as:

$$\left|\frac{i_2}{i_1}\right|. \tag{4}$$

When signaling at half a bit per second at 30 Hz, then the signaling bandwidth is on the order of 1 Hz. The ambient magnetic noise field is expected to be extremely small. By way of example and not limitation, an ambient magnetic noise field on the order of 2.65 $10^{-7}$ amperes per meter is expected for a signaling bandwidth of 1 Hz. For w=30 Hz and R=1 ohm, then:

$$\left|\frac{i_2}{i_1}\right| = 8.7\times10^{-4}. \tag{5}$$

In order to achieve an ambient noise level of 10 dB above the ambient noise in a neighboring window, the excitation field in the other window need be only about a milliampere per meter. A receiver with a sharply filtered front end can detect and demodulate this weak intra-building excitation field, and its associated magnetic signaling, from one flux window to the window immediately above or below it.

To establish the required excitation in accordance with the foregoing, and in an exemplary embodiment, a solenoid coil is used. The coil has a selected number of turns N regularly spaced along a tubular form of length L with a radius equal to 'a' meters and carrying a current of i amperes. The solenoid coil exhibits an approximate internal magnetic filed of (Ni/2a).

Figure 4:
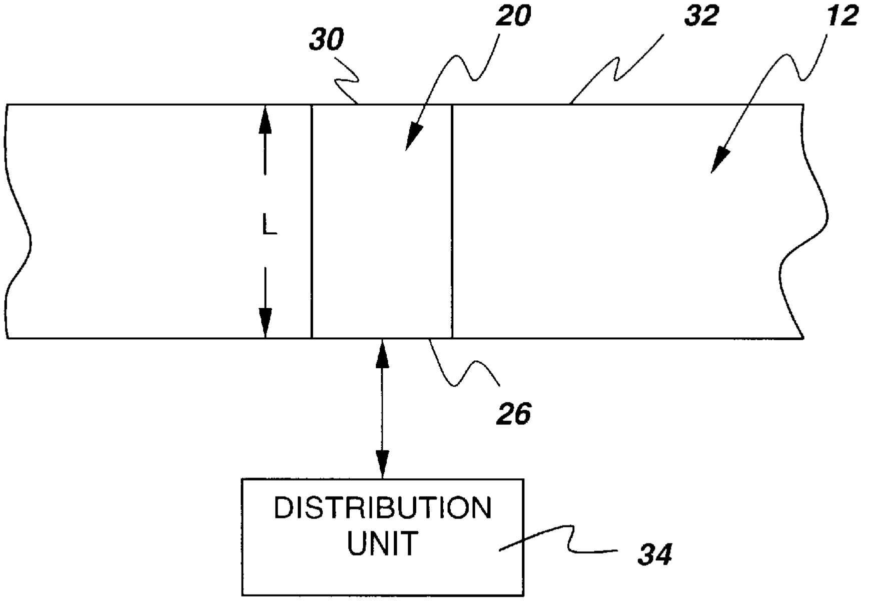
FIG. 4 is a top view of a portion of a frame member and a transmit coil.

Referring to FIG. 4, which is a top view of frame member 12 and transmit coil 20, coil length L is selected to equal the width of frame member 12, which in this exemplary embodiment is about 0.3 meters. Coil 20 is positioned as near to frame member 12 as possible without physically contacting member 12, and one end 26 of coil 20 is near one side 28 of frame member 12 and an opposing end 30 of coil 20 is near an opposing side 32 of frame member 12. Coil 20 is electrically connected to distribution unit 34.

Assuming that about one-tenth of coil 20 produced flux encircles, or extends around, frame member 12, the coil requirements are:

$$\frac{Ni}{2a}\cdot\frac{\pi a^2}{23}\geq 10^{-2}\ \text{amperes/meter} \quad (6)$$

where the factor of 23 is the number of square meters in a window. The coil requirements can be simplified to:

$$Nia \geqq 0.15\ \text{amperes-meter}, \quad (7)$$

which can be met by many combinations. In the exemplary embodiment, coil 20 has the following dimensions:

L=0.3 meters,

N=100 turns, a=0.05 meters, and i=30 milliamperes.

Other coils used in the exemplary embodiment would have identical dimensions.

Figure 5:
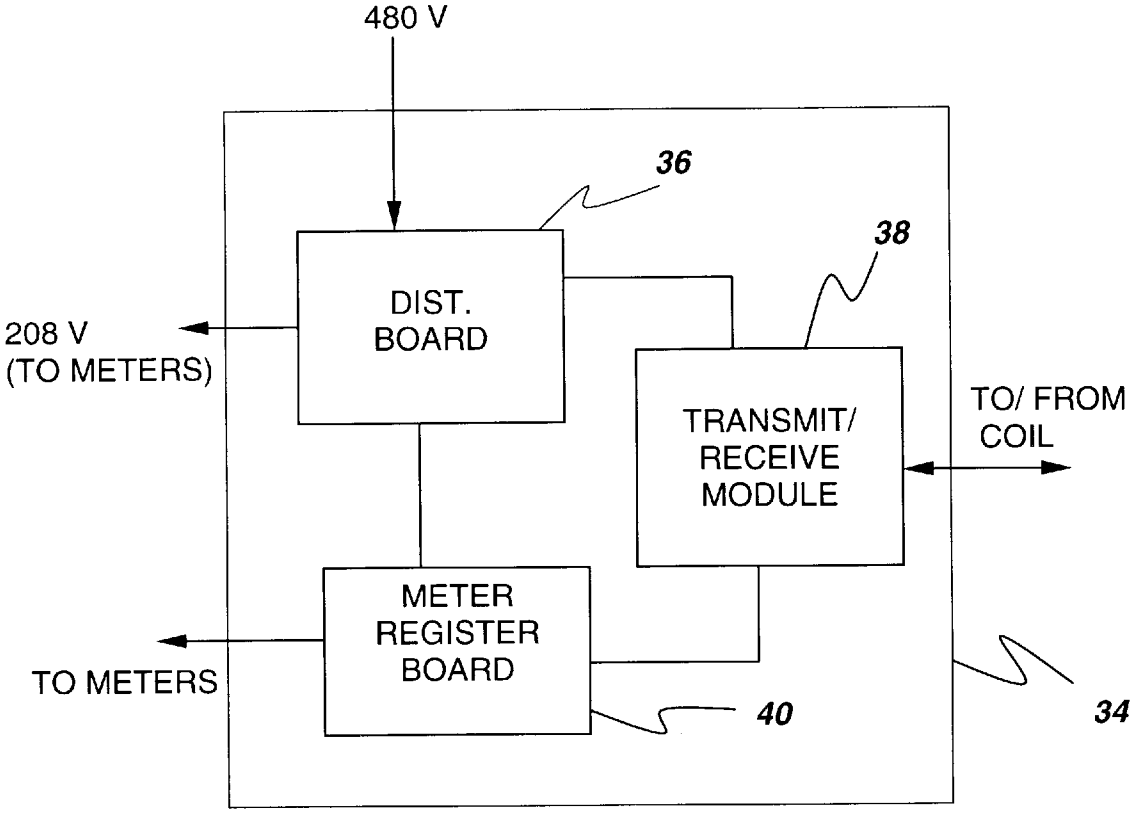
FIG. 5 is a block diagram of a distribution unit.

FIG. 5 is a block diagram of distribution unit 34. Unit 34 is shown configured to excite coil 20 according to one embodiment of the invention. Unit 34 includes a distribution board 36, which is a commonly used distribution board currently known and commercially available. Such board 36 receives, for example, a 480V line voltage and steps down the voltage for 208V for distribution to the units (e.g., coupled to the electricity meters) on the building floor associated with board 36. Unit 34 also includes a transceiver module 38 and a meter register board 40. In the embodiment shown in FIG. 5, meter register board 40 is directly coupled to electricity meters on the respective floor and receives consumption data from such meters. For example, kilowatt hour data is transmitted from each meter to meter register board 40.

Register board 40 includes, for example, a processor programmed to perform well known register functions and a memory for storing metering data, including quantities calculated by board. Register board 40 is powered by energy supplied from distribution board 36. By performing register functions at unit 34 rather than at each individual metering site, the functionality required to be performed by each meter can be reduced. Locating increased functionality at a register node and decreasing functionality at a meter node is described, for example, in U.S. Pat. No. 5,696,501, which is assigned to the present assignee.

In an alternative configuration, distribution board 36 and meter register board 40 are combined on one board and communications between such combined board and the meters is performed via the power distribution lines. Many other variations, e.g., intra-building communications may be performed via radio, are contemplated.

Transmit and receive module 38 includes a modulator and a demodulator for transmitting and receiving data. Such modulators and demodulators are well known in the art and are commercially available. Module 38 also is powered by energy supplied from distribution board.

In an exemplary implementation, the meter register board processor is programmed to transmit metering data stored in the register memory at predetermined intervals (e.g., once per day and at a different time of day from the time at which other register board processors in the building are programmed for transmission). At the predetermined time, the register processor transmits the metering data to module 38, which generates a modulated current signal for exciting coil 20. The induced current in the coil on the floor below coil 20 is detected by the transmit/receive module 38 of the distribution unit for that floor, and that unit again relays ("mutters") the same data to the coil on the floor below it.

The data is transmitted from floor to floor until it is received at a collection unit (not shown). The collection unit is similar to distribution unit except that if collection unit itself does not perform power distribution and meter reading functions, such collection unit need not include a distribution board. The received data is stored in the collection unit register memory. A meter reader can then collect all the data for all meters in the building at the collection unit (e.g., located on the lowermost floor of the building). Alternatively, the collection unit could be coupled to a radio or power line transceiver for transmitting the collected data to a central processing station.

As explained above, the present invention enables performance of AMR functions in a high rise building by utilizing the building frame to facilitate, rather than inhibit, communications. In addition, since the building frame itself is utilized as a communication medium, there is no need for extensive wiring from floor to floor, which facilitates reduced capital investment for implementation.

Although the invention has been described and illustrated in detail, it is to be clearly understood that the same is intended by way of illustration and example only and is not to be taken by way of limitation. For example, the communications described above refers to transmission of a signal from a first, higher elevation to a second, lower elevation. Signals could be propagated in the reverse direction, i.e., upwards, or sideways along adjacent frames. Accordingly, the spirit and scope of the invention are to be limited only by the terms of the appended claims.

What is claimed is:

1. A communication system for a building comprising:

a metal building frame forming a structure of the building wherein the metal building frame includes a plurality of enclosed interconnected 2-D geometric units;

a first coil positioned within one of the plurality of geometric units;

circuitry coupled to the first coil, the circuitry exciting the first coil with a time varying signal to induce a signal within said one of the plurality of geometric units; and a second coil positioned in an adjacent one of the plurality of geometric units to receive the signal from the first coil through the metal building frame.

2. The communication system of claim 1 wherein the first coil is located within a flux window of the one of the plurality of geometric units and wherein the second coil is located within a flux window of the adjacent one of the plurality of geometric units.

3. A communication system for a building comprising:

a metal building frame forming a building structure wherein the metal building frame includes a plurality of enclosed interconnected 2-D geometric units;

a first coil positioned within one of the plurality of geometric units;

circuitry coupled to the first coil, the circuitry comprising:

a meter register board having a memory for storing metering data, wherein the circuitry excites the first coil with a time varying signal corresponding to the metering data stored in the memory of said register board, the time varying signal inducing a signal within said one of the geometric units;

a second coil positioned in an adjacent one of the plurality of geometric units to receive the signal from the first coil through the metal building frame.

4. The communication system of claim 3 wherein the one of the plurality of geometric units comprises a building face having a plane and the first coil being positioned the plane of the building face.

5. The communication system of claim 3 wherein the first coil is located within a flux window of the one of the plurality of geometric unit and wherein the second coil is located within a flux window of the adjacent one of the plurality of geometric units.

6. The communication system of claim 3 wherein the one of the plurality of geometric units comprises a building face having a plane and the first coil being positioned the plane of the building face.

7. A method for communicating in a building comprising the steps of:

providing a metal building frame forming a structure of the building;

including in the metal building frame a plurality of enclosed 2-D geometric units;

locating a first coil within one of the plurality of geometric units;

exciting the first coil with a time varying signal corresponding to metering data, the time varying signal inducing a signal within said one of the plurality of enclosed 2-D geometric units;

positioning a second coil within an adjacent one of the plurality of geometric units; and receiving the signal from the first coil through the metal building frame using the second coil.

8. The method of claim 7 wherein the first coil is located within a flux window of the one of the plurality of geometric units and wherein the second coil is located within a flux window of the adjacent one of the plurality of geometric units.

9. The method of claim 7 wherein the one of the plurality of geometric units comprises a building face having a plane and the first coil being positioned the plane of the building face.

10. A method for communicating in a building comprising the steps of:

providing a metal building frame forming a structure of the building;

including in the metal building frame a plurality of enclosed 2-D geometric units;

locating a first coil within one of the plurality of geometric units;

exciting the first coil with a time varying signal;

inducing a signal within said one of the plurality of enclosed 2-D geometric units via said step of exciting the first coil;

positioning a second coil within an adjacent one of the plurality of geometric units; and receiving the signal from the first coil through the metal building frame using the second coil.

11. The method of claim 10 wherein the first coil is located within a flux window of the one of the plurality of geometric units and wherein the second coil is located within a flux window of the adjacent one of the plurality of geometric units.

12. The method of claim 10 wherein the one of the plurality of geometric units comprises a building face having a plane and the first coil being positioned the plane of the building face.

* * * * *